Dec. 13, 1932.  T. NOSE  1,891,170
AEROPLANE
Filed June 16, 1931
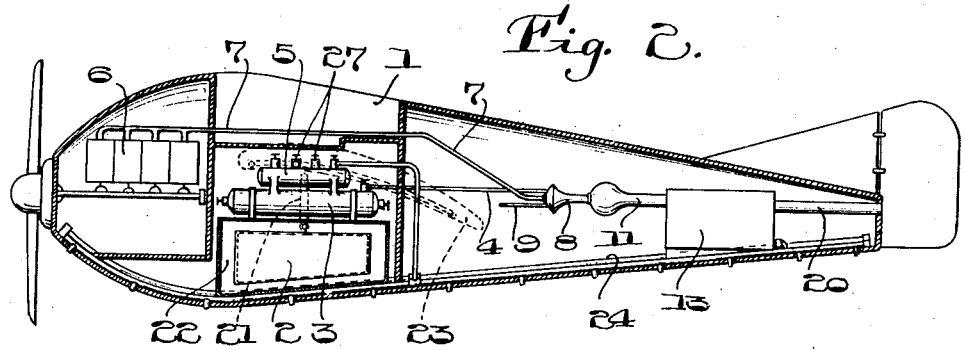
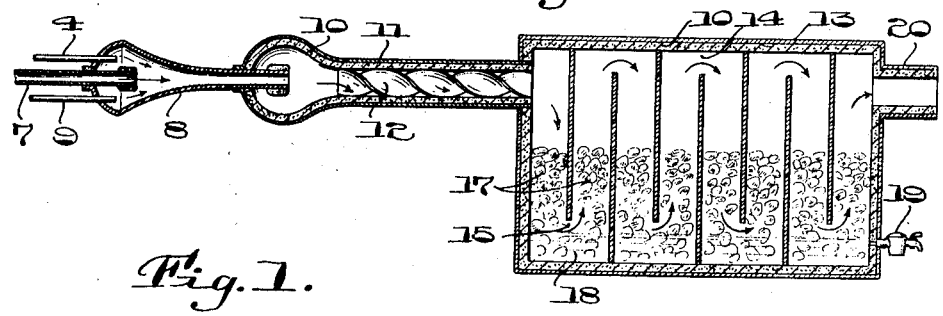
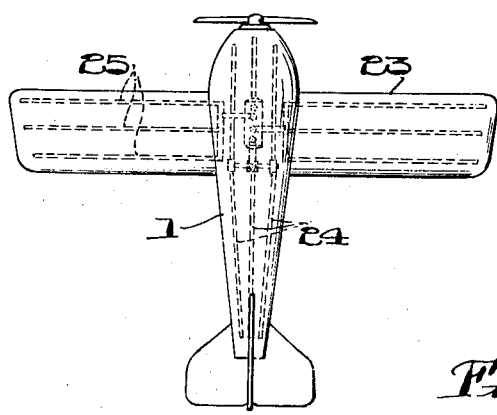
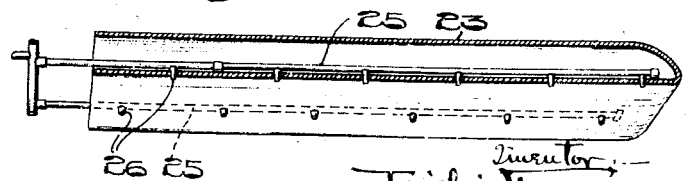

Patented Dec. 13, 1932

1,891,170

UNITED STATES PATENT OFFICE

TOICHI NOSE, OF KAMAKURA MACHI, KAMAKURA GUN, KANAGAWA KEN, JAPAN

AEROPLANE

Application filed June 16, 1931, Serial No. 544,868, and in Japan June 13, 1930.

This invention relates to improvements in an aeroplane and more particularly to a device for absorbing or eliminating the noise of the exhaust of the aeroplane engine. The primary object thereof is to eliminate explosion noise by conducting the exhaust of the aeroplane engine to a noise eliminating device together with ammonia gas and air, passing these gases through a helical path to reduce their energy, passing them windingly among the partition walls projected alternately from the upper and lower ends and also through a layer of porous material such as pumice stone (fire-resisting stone), passing them through the lime water contained in the bottom of an eliminator box to decompose and absorb carbon dioxide and hydrocarbon and thus reducing the volume of the gases considerably. The second object is to make said eliminating device fit for practical use by removing the danger of a fire occurring in it.

The other object is to extinguish a fire immediately which occurs in an aeroplane by some accident by leading the ammonia gas used for the eliminator to a suitable place such as the fuselage, wings, etc. by means of a pipe and jetting said gas when the pilot opens the cock.

Referring to the accompanying drawing which shows an example of the aeroplanes embodying the present invention, Fig. 1 is a general plan of an aeroplane;

Fig. 2, a longitudinal section through the fuselage;

Fig. 3, an enlarged longitudinal section of the noise absorbing device and

Fig. 4, an enlarged sectional view of a wing.

In the drawing, 1 is a fuselage, 2 a gasoline tank with an ammonia jacket 22 at the outside, 3 a reservoir containing ammonia gas under pressure, 21 a pipe leading from the ammonia reservoir 5 to ammonia jacket 22, 4 a pipe for conducting said gas to the eliminator, 5 a reservoir provided with several cocks 27 for distributing said gas to a suitable place such as the fuselage or wings, 6 a motor, and 7 a pipe for leading the exhaust from said motor to the eliminator.

The fuselage 1 and the wing 23 have distributing pipes 24 and 25 arranged thereon, each of the pipes having a number of blowing nozzles 26. In the drawing said nozzles 26 open on the lower surface of the fuselage or wings, but may be so constructed as to open on their inner or upper surfaces. Said pipes are connected with the reservoir 5 through the cocks 27. 8 is a tube converging towards its open end from the closed end, and in its larger end are inserted the exhaust pipe 7, ammonia gas pipe 4 and air pipe 9. The smaller end of said tube 8 is lined with soundproof material 10 and is inserted in the enlarged end of a guide tube 11, in the inner surface of the cylindrical part of which is inserted a helical guide plate 12. The other end of the guide tube 11 opens in an eliminator box 13 lined with soundproof material, the eliminator box having several partition walls 16 with passages 14 and 15 up and down alternately so as to form a gas passage which winds up and down. Said eliminator box is filled with a layer 17 of porous material such as pumice stone (fire-resisting stone) to a suitable height and has lime water 18 at its bottom. 19 is an exhaust trap, and 20 the exhaust pipe of the eliminator.

According to the present invention the exhaust from the motor which passes through the pipe 7 is discharged into the guide tube 11 through the pipe 8 together with the ammonia gas and air which pass through the pipes 4 and 9 respectively, passing through the helical path around the helical plate and losing part of their energy and then entering the box 13 while they are being mixed together. Now, the exhaust gas does not consist of carbon dioxide alone, but usually contains a large amount of hydro carbon, so if it is mixed with ammonia gas and air properly when it is conducted to the eliminator, it will cause chemical reaction instantly on account of its high temperature. Thus, the oxygen and ammonia contained in the hydro carbon and air of the exhaust gas are combined into water vapor, carbon dioxide or ammonia hydroxide and flow into the eliminator.

Said mixed gas impinges against the partition walls 16 and the water vapor cools gradually during its penetration of the mass of pumice stone (fire-resisting stone) and falls down on the bottom, while the carbon dioxide is absorbed by the lime water contained at the bottom. Consequently, the exhaust gas has its pressure and volume reduced considerably during its circuitous travel through the eliminator box and is discharged into the atmosphere from the pipe 20 without transmitting any sound.

A fire often occurs in an aeroplane during its navigation on account of the gasoline catching fire. The present invention has the advantage of being able to extinguish fire by simple means as follows:—

As the gasoline tank 2 is surrounded by the ammonia jacket 22, it does not catch fire. Also, in case of the fuselage or wings catching fire, if the cock 27 is opened, ammonia gas will be jetted from the nozzles 26 through the distributing pipes 24 and 25 to extinguish the fire speedily. Ammonia having small specific gravity, it does not increase the weight of an aeroplane comparatively, if the fuselage is loaded with it, but rather increases its lifting power.

I claim:

1. In an aeroplane having a fuselage and wings; a tank containing ammonia gas under pressure; valved distributor pipes leading from the tank disposed in the wings and fuselage, said pipes having spaced jet orifices, a fuel tank, a jacket enveloping the fuel tank, and a valved pipe connecting the gas tank with the jacket.

2. In an aeroplane having a fuselage and wings; a tank containing ammonia gas under pressure; valved distributor pipes leading from the tank disposed in the wings and fuselage, said pipes having spaced jet orifices, an engine having an exhaust pipe, an eliminator box in the exhaust pipe; a valved pipe connecting the gas tank with the exhaust pipe in advance of the box; and means in the box for absorbing the carbon monoxide of the exhaust gases.

3. In an aeroplane having a fuselage and wings; a tank containing ammonia gas under pressure; valved distributor pipes leading from the tank disposed in the wings and fuselage, said pipes having spaced jet orifices, an engine having an exhaust pipe, an eliminator box in the exhaust pipe having a tortuous passage therethrough; a valve pipe connecting the gas tank with the exhaust pipe in advance of the box; means for introducing air into the exhaust pipe in advance of the box; and a mass of porous material and lime water in the tortuous passage of the box.

4. In an aeroplane having a fuselage and wings; a tank containing ammonia gas under pressure; valved distributor pipes leading from the tank disposed in the wings and fuselage, said pipes having spaced jet orifices, an engine having an exhaust pipe, an eliminator box in the exhaust pipe having a tortuous passage therethrough; a valved pipe connecting the gas tank with the exhaust pipe in advance of the box; means for introducing air into the exhaust pipe in advance of the box; a guide tube having a helical passage interposed in the exhaust pipe in advance of the box; and a mass of porous material and lime water in the tortuous passage of the box.

5. In an aeroplane having a fuselage and wings and having an engine provided with an exhaust pipe; a tank containing ammonia gas under pressure; an eliminator box in the exhaust pipe having a tortuous passage therethrough; a valved pipe connecting the gas tank with the exhaust pipe in advance of the box; and means in the box for absorbing the noise of and for absorbing the carbon monoxide of the exhaust gases.

6. In an aeroplane as set forth in claim 5, a fuel tank in the fuselage, a jacket enveloping the fuel tank, and a valved pipe connecting the gas tank with the jacket.

7. In an aeroplane as set forth in claim 5, valved distributor pipes leading from the gas tank disposed in the wings, and spaced jet orifices in the said pipes.

8. In an aeroplane as set forth in claim 5, means for introducing air into the exhaust pipe in advance of the box.

9. In an aeroplane as set forth in claim 5, a guide tube having a helical passage therethrough interposed in the exhaust pipe in advance of the box.

10. In an aeroplane as set forth in claim 5, a guide tube having a helical passage therethrough interposed in the exhaust pipe in advance of the box; and a covering of sound proofing material around the guide tube.

11. In an aeroplane as set forth in claim 5, said box having spaced partitions therein forming the tortuous passage, and a mass of porous material disposed in the said passage.

12. In an aeroplane as set forth in claim 5, said box having spaced partitions therein forming the tortuous passage, and a mass of porous material disposed in the said passage, the lower portion of the box containing lime-water through which the gases are passed.

13. In an aeroplane as set forth in claim 5, said box having spaced partitions therein forming the tortuous passage, and a mass of porous material disposed in the said passage, the lower portion of the box containing lime-water through which the gases are passed, and a covering of sound proofing material around the box.

14. In an aeroplane as set forth in claim 5, a gas velocity reducing chamber in the exhaust pipe in advance of the box, and said pipe from the gas tank discharging into said chamber.

15. In an aeroplane as set forth in claim 5, a gas velocity reducing chamber in the exhaust pipe in advance of the box, said pipe from the gas tank discharging into said chamber, and a guide tube having a helical passage interposed between the chamber and box.

TOICHI NOSE.